(12) United States Patent
Ostwald (10) Patent No.: US 6,607,344 B2
(45) Date of Patent: Aug. 19, 2003

(54) MECHANICAL GRIPPER/ADAPTER FOR USE WITHIN A DATA CARTRIDGE LIBRARY

(75) Inventor: Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 1 day.

(21) Appl. No.: 09/866,122

(22) Filed: May 29, 2001

(65) Prior Publication Data
US 2002/0182039 A1 Dec. 5, 2002

(51) Int. Cl.[7] .............................................. G11B 17/22
(52) U.S. Cl. ..................... 414/281; 414/225.01; 360/92
(58) Field of Search ....................... 414/222.01, 225.01, 414/226.02, 226.05, 281, 282, 751; 360/92, 96.5

(56) References Cited

U.S. PATENT DOCUMENTS

| | | | | |
|---|---|---|---|---|
| 3,669,456 A | * | 6/1972 | Oteki | 274/4 C |
| 4,860,133 A | * | 8/1989 | Baranski | 360/92 |
| 5,237,467 A | * | 8/1993 | Marlowe | 360/92 |
| 5,277,540 A | * | 1/1994 | Helms et al. | 414/751 |
| 5,416,653 A | * | 5/1995 | Marlowe | 360/92 |
| 5,450,391 A | * | 9/1995 | Pollard | 369/191 |
| 5,487,579 A | * | 1/1996 | Woodruff | 294/115 |
| 6,385,003 B1 | * | 5/2002 | Ellis | 360/92 |

* cited by examiner

Primary Examiner—Eileen D. Lillis
Assistant Examiner—Charles A. Fox
(74) Attorney, Agent, or Firm—Carstens, Yee & Cahoon, LLP; Wayne P. Bailey

(57) ABSTRACT

A fully mechanical gripper for grasping and releasing data cassette cartridges is disclosed. The gripper may be built into a robotic picker, or may be implemented as an adapter to be fitted to an existing robotic picker. When used as an adapter, the present invention provides the added functionality of allowing a single robotic picker to carry different sized tapes by connecting and disconnecting itself to the adapter.

11 Claims, 9 Drawing Sheets

MECHANICAL GRIPPER/ADAPTER FOR USE WITHIN A DATA CARTRIDGE LIBRARY

BACKGROUND OF THE INVENTION

1. Field of the Invention

The present invention is directed generally toward gripping mechanisms for handling magnetic tape cartridges. More specifically, the present invention is directed toward a passive (completely mechanical) apparatus for gripping a data cassette within a robotic media storage library.

2. Background of the Invention

Robotic media storage libraries are devices for providing automated access to a large collection of data stored on multiple physical storage media, such as magnetic tape cartridges or compact discs. Robotic media storage libraries generally contain a plurality of storage locations for physical media, one or more media drives for reading or writing physical media and a manipulator or "picker" for moving physical media from a storage location to a drive and back. Robotic media storage libraries may have special storage locations designated for certain purposes, such as serving as a temporary storage location while two pieces of media are being swapped or for adding or removing physical media from the library.

When magnetic tape cartridges are used in a storage library, there are basically two commonly employed methods by which the robotic picker grasps a tape cartridge for manipulation. One method is to use an electric motor, actuator, or solenoid to operate some kind of gripping mechanism. Another method to use a hook and channel, where a hook on the robotic picker engages a channel in the tape cartridge and drags the tape out of its storage location.

Both of these methods have definite disadvantages. Although electric grippers are effective, they are expensive, and the small electric motors used can burn out. Hook and channel systems do not provide positive locking with a tape cartridge; thus, hook and channel systems often drop tapes within the library.

What is needed then, is a gripping mechanism for grasping tape cartridges that does not rely on expensive electric motors or solenoids.

SUMMARY OF THE INVENTION

The present invention provides a fully mechanical gripper for grasping and releasing data cassette cartridges. The gripper may be built into a robotic picker, or may be implemented as an adapter to be fitted to an existing robotic picker. When used as an adapter, the present invention provides the added functionality of allowing a single robotic picker to carry different sized tapes by connecting and disconnecting itself to the adapter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
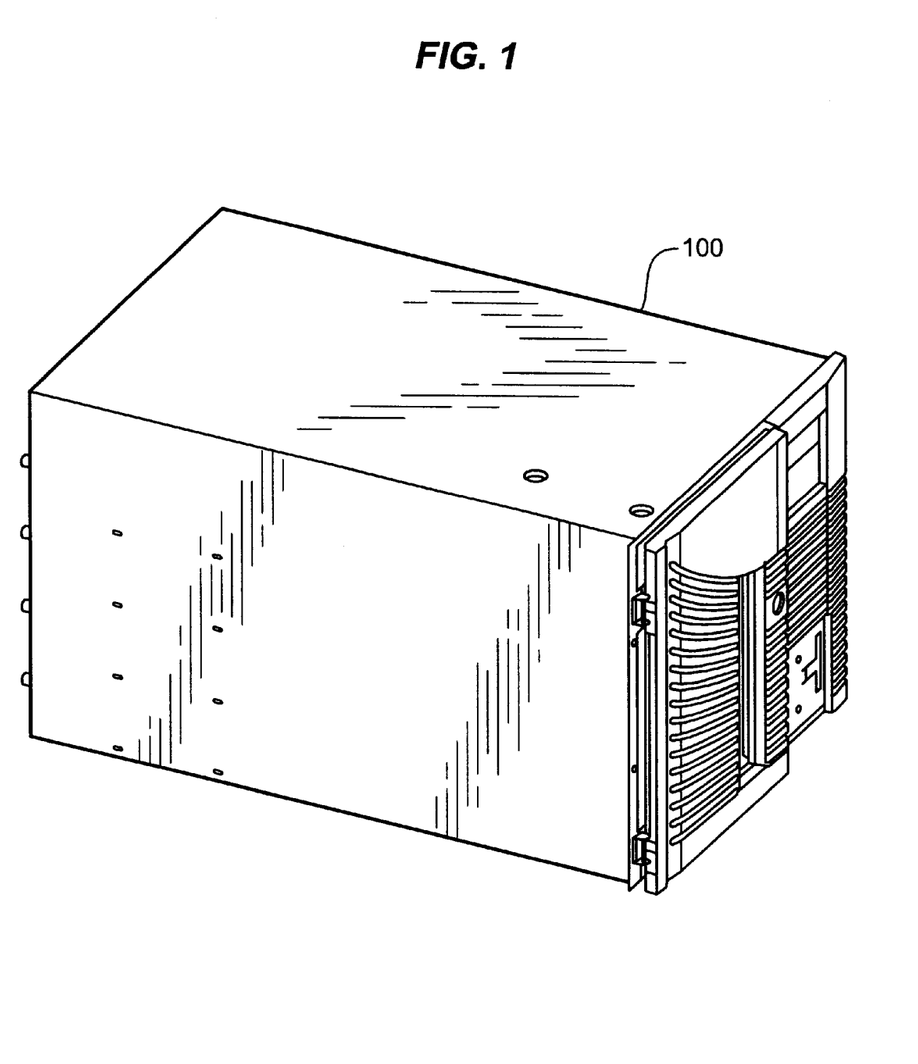
FIG. 1 is an external view of a robotic tape library in accordance with a preferred embodiment of the present invention.
Figure 2:
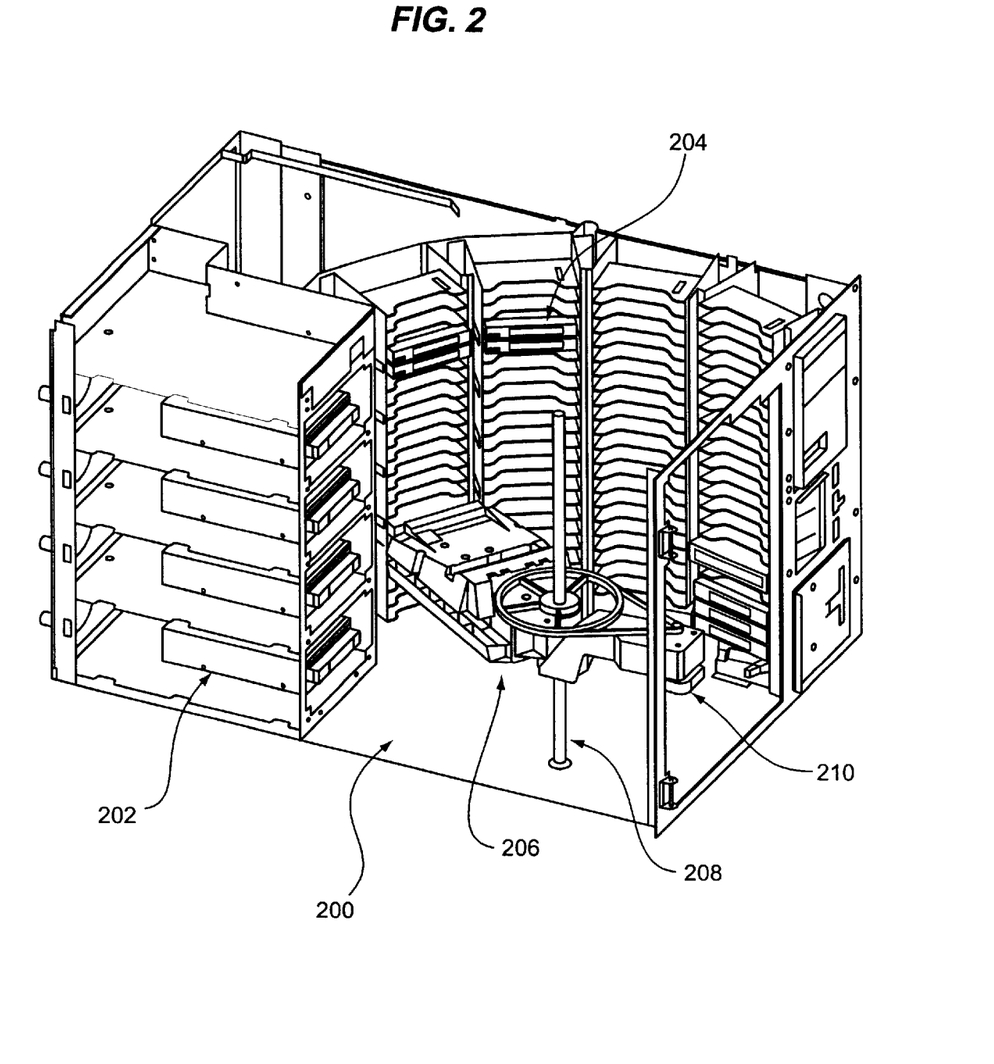
FIG. 2 is a cutaway view of a robotic tape library in accordance with a preferred embodiment of the present invention.

FIG. 1 depicts a typical data cartridge library 100 for automated storage and use of data cassettes. The model shown is a rack-mount type enclosure holding 100 data cassettes and 4 data cassette recorders. FIG. 2 provides an internal cutaway view of library 100. Chassis 200 provides a framework for cassette recorders 202, cassette storage cells 204, and robotic picker assembly 206. Robotic picker assembly 206 loads cassettes from cassette storage cells 204 to cassette recorders 202 for reading and writing. Likewise, when cassettes are no longer being read or written, robotic picker assembly 206 returns the cassettes to cassette storage cells 204. Robotic picker assembly 206 is capable of rotating about a vertical axis and moving up or down along vertical shaft 208 using servo motors 210 and related control circuitry.

Figure 3:
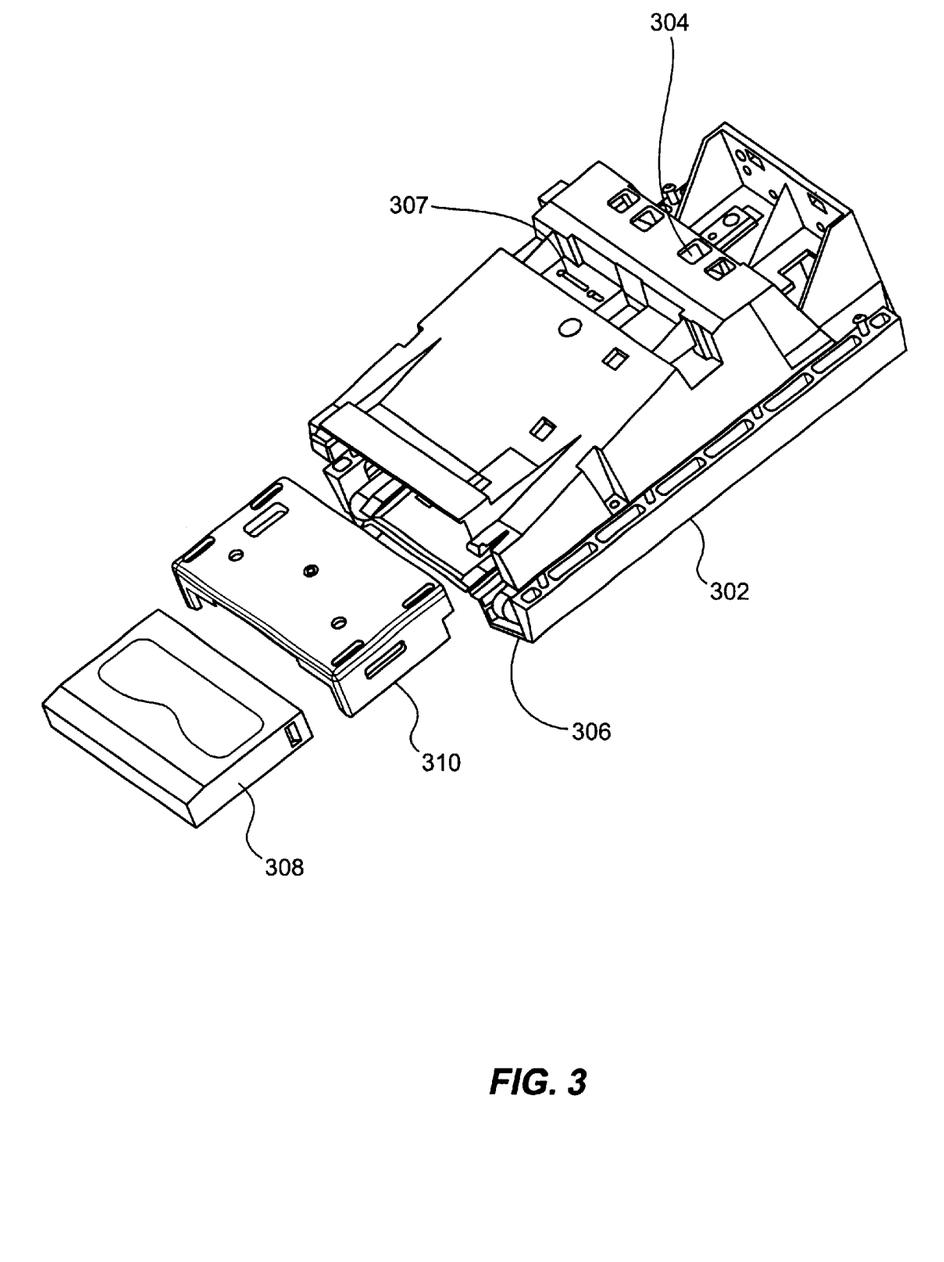
FIG. 3 is diagram of a subassembly of a robotic picker in accordance with a preferred embodiment of the present invention.

FIG. 3 is a diagram of a subassembly 302 of robotic picker assembly 206 (in FIG. 2). Subassembly 302 contains a servo motor 304 and belt drive 306 to extend or retract a reach carriage 307 in a radial direction with respect to vertical shaft 208 (in FIG. 2). Reach carriage 307 can be driven into contact with a data cassette 308 or into contact with cassette adapter module 310 as required. A large cassette may be grasped directly using reach carriage 307, while smaller cassettes may be grasped using adapter module 310. Thus, both large- and small-sized cassettes may be stored in the same library, with subassembly picking up and holding adapter module 310 to use with smaller tapes only when necessary, and storing adapter module 310 in some location in the library when not in use.

In an alternative embodiment of the invention, the mechanism of adapter module 310 may be built directly and permanently into subassembly 302, so that no adapter module is necessary. Thus, the mechanism described herein may be embodied in either an adapter module for use with an existing robotic picker or in the robotic picker directly.

Figure 4A:
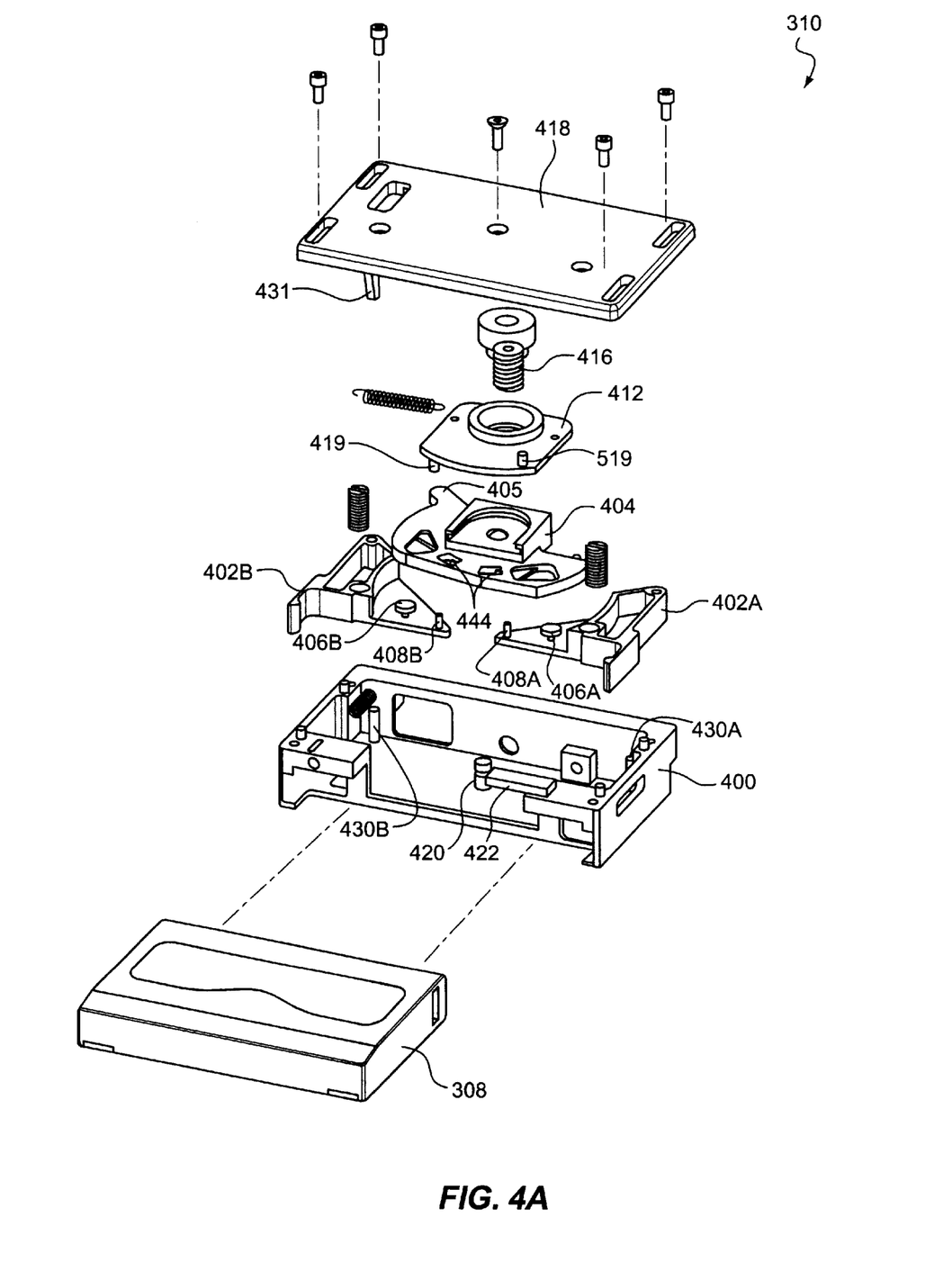
FIG. 4A is an exploded view of an adapter module in accordance with a preferred embodiment of the present invention.

FIG. 4A is an exploded view of adapter module 310. Module 310 is contained by housing 400, which is designed to be the same size in width and height as a large data cassette, so that the adapter will fit into the aperture of reach carriage 307. A pair of gripper fingers 402A and 402B are actuated by gripper cam 404 to grasp a smaller data cassette. Gripper cam 404 is actuated by applying pressure against gripper cam lever 405, which protrudes from the rear of the gripper cam 404.

To grip a data cassette, robotic picker subassembly 302 (in FIG. 3) extends reach carriage 307 until adapter module 310 strikes against one of cassette recorders 202 or cassette storage cells 204. When adapter module 310 makes contact, adapter housing 400 is prevented from moving forward, and a special boss (not shown) attached to reach carriage 307 applies pressure to gripper cam lever 405.

Applying pressure to gripper cam lever 405 causes gripper cam 404 to rotate around center pin 420, locking pins 408A and 408B to move out of a locked position within locking channels 444, and gripper cam followers 406A and 406B on gripper fingers 402A and 402B to engage cam surfaces in gripper cam 404 to drive gripper fingers 402A and 402B to hinge about pivot pins 430A and 430B. This causes gripper fingers 402A and 402B to make a gripping or ungripping motion with respect to data cassette 308.

Whether gripper fingers 402A and 402B grip or ungrip is determined by the position of shifter plate 412. Shifter plate 412 is configured to rotate up and down shift screw 416. Doing so causes gripper cam 404 to shift up and down center pin 420, because gripper cam 404 is connected to shifter plate 412 through mounting flange 417 (FIG. 4B) When reach carriage 307 is retracted, stop pin 431 catches on a surface of robotic picker subassembly 302 (in FIG. 3). This causes top plate 418 to slide forward relative to housing 400.

Figure 4B:
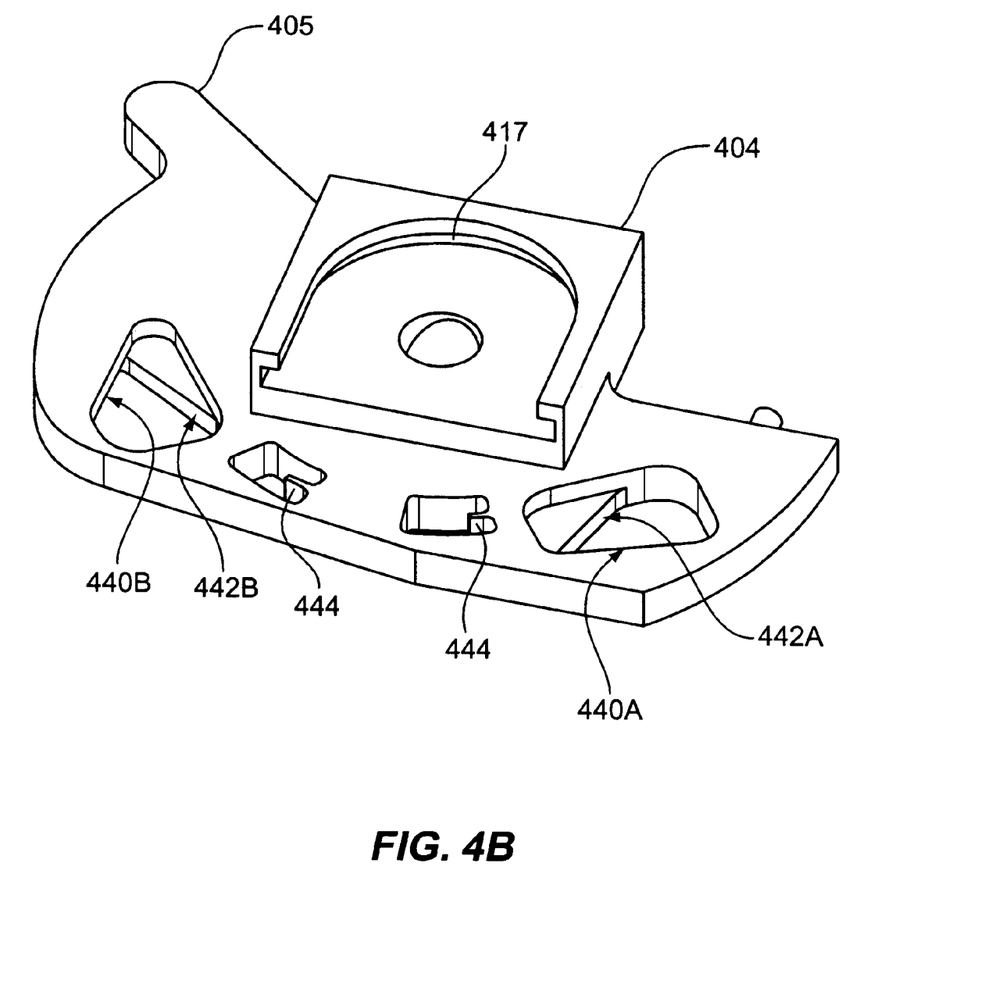
FIG. 4B is an enlarged view of a gripper cam in accordance with a preferred embodiment of the present invention.

If no cassette is loaded into adapter 310 and reach carriage 307 is retracted, stop pin 519 will make contact with stationary peg 422. This contact with stationary peg 422 will cause shifter plate 412 to rotate counter-clockwise when reach carriage 307 is retracted, moving gripper cam 404 downward so that gripper cam 404 enters into contact with gripper cam followers 406A and 406B on grip cam surfaces 440A and 440B (FIG. 4B). When reach carriage 307 is then extended, adapter housing 400 strikes storage cell 204, lever 405 is actuated, gripper cam 404 begins to rotate, and gripper fingers 402A and 402B close in to grasp data cassette 308.

If data cassette 308 is loaded in adapter 310, stop pin 419 will be in contact with data cassette 308. Thus, when reach carriage 307 is retracted, shifter plate 412 will rotate clockwise, and gripper cam 404 will move upward and enter into contact with gripper cam followers 406A and 406B on ungrip cam surfaces 442A and 442B (FIG. 4B). When reach carriage 307 is then extended into contact with storage cell 204, top plate 418 slides forward, gripper cam 404 begins to rotate, and gripper fingers 402A and 402E release their grasp of data cassette 308.

Figure 5:
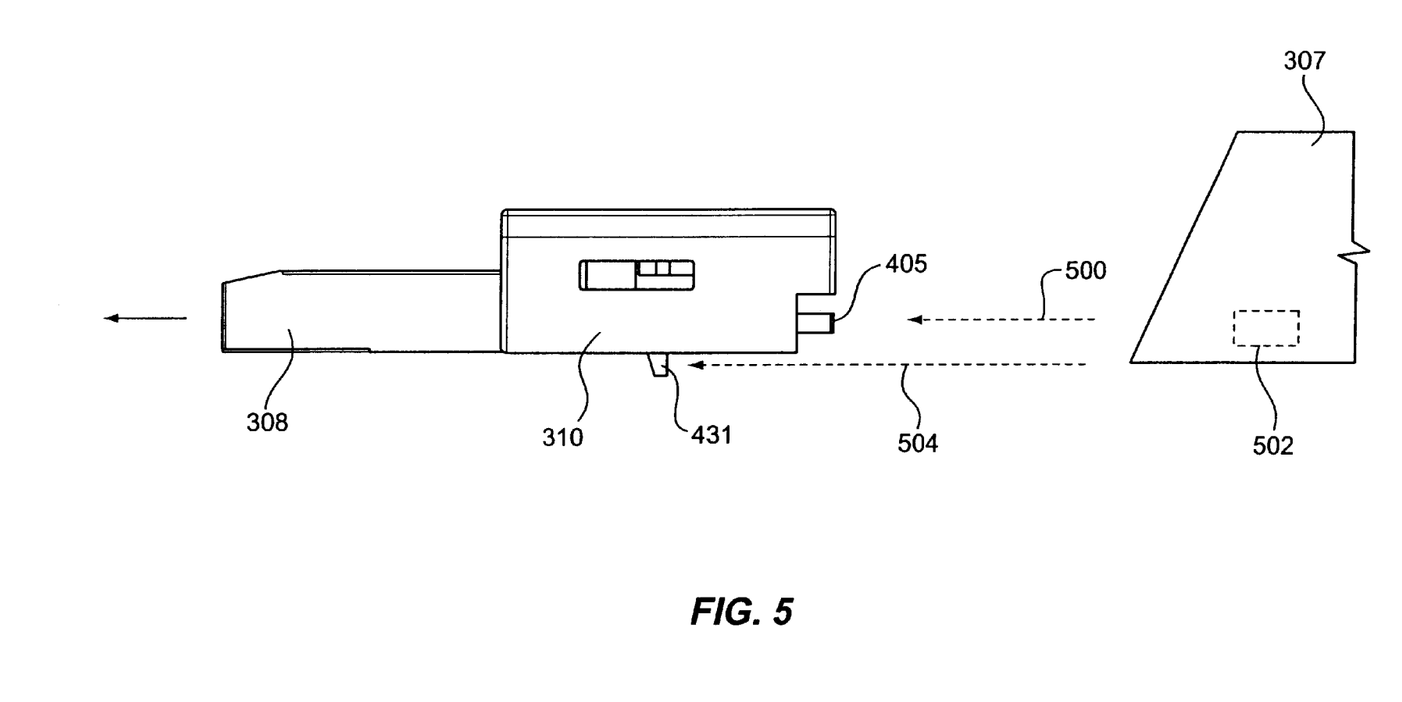
FIG. 5 is a side profile view of the operation of an adapter module in accordance with a preferred embodiment of the present invention.

FIG. 5 is a diagram of a side view of a preferred embodiment of the present invention. Data cassette 308 is held in adapter module 310. The mechanisms of adapter module 310 are actuated by stop pin 431, which protrudes from the bottom of adapter module 310 and gripper cam lever 405, which protrudes from the rear of adapter module 310. Reach carriage 307 applies force 500 to adapter module 310 at gripper cam lever 405, when extending adapter module 310 to pick up or release data cassette 308. Picker subassembly 302 includes a stationary boss 502, which applies force 504 to stop pin 431 when reach carriage 307 is retracted.

Figure 6:
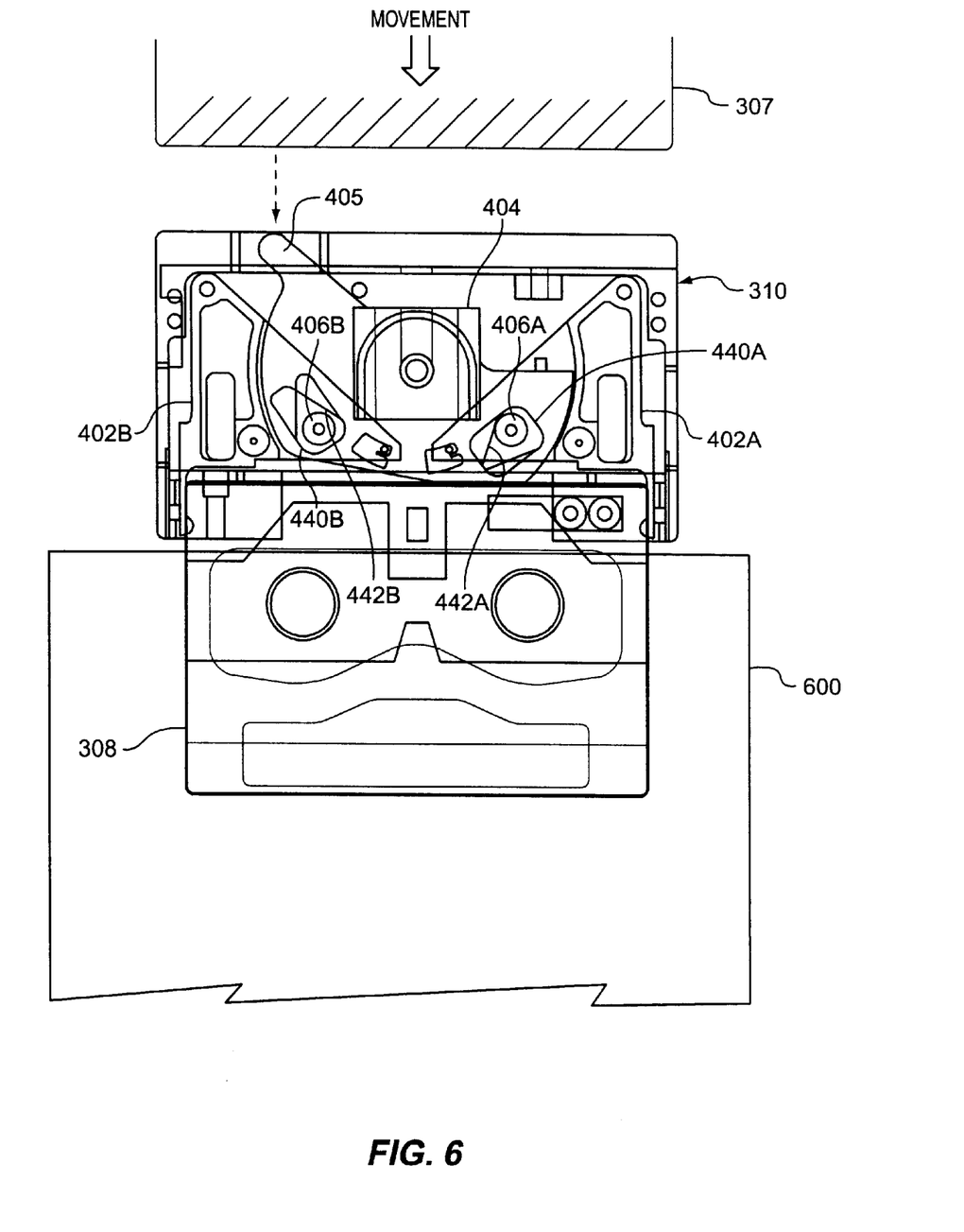
FIG. 6 is a transparent top view of an adapter module with loaded data cassette in accordance with a preferred embodiment of the present invention.

FIG. 6 is a transparent top view of adapter module 310 in accordance with a preferred embodiment of the present invention, shown releasing data cassette 308 into tape drive 600. Gripper cam lever 405, when actuated by reach carriage 307, rotates gripper cam 404 in a counter-clockwise direction. Gripper cam followers 406A and 406B, which engage ungrip cam surfaces 442A and 442B, are moved by the rotated gripper cam 404 so as to cause gripper fingers 402A and 402B to open and release data cassette 308. When gripper cam followers 406A and 406B engage grip cam surfaces 440A and 440B instead, gripper fingers 402A and 402B close when gripper cam lever 405 is actuated by reach carriage 307.

Figure 7:
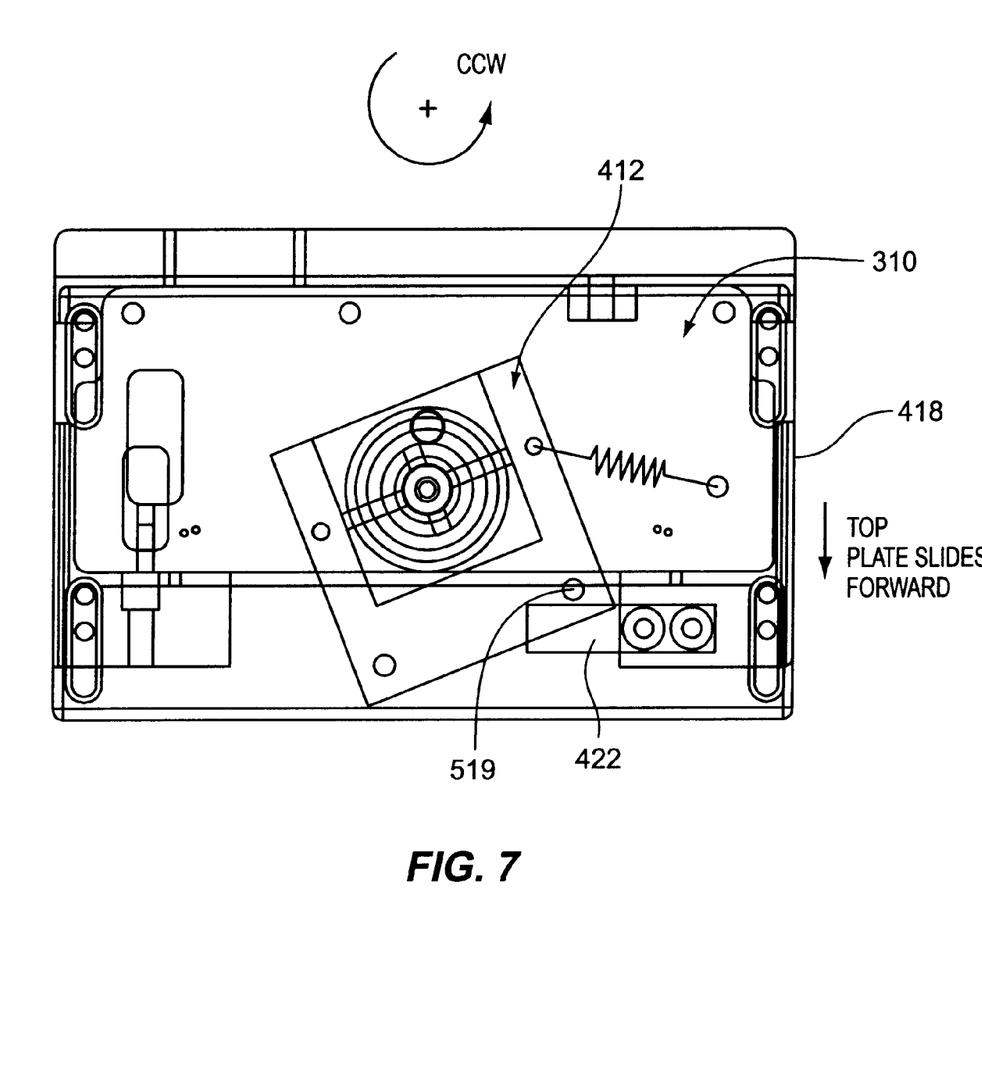
FIG. 7 is a partial transparent top view of an empty adaptor module in accordance with a preferred embodiment of the present invention.

FIG. 7 is a partial transparent top view of adapter module 310 in accordance with a preferred embodiment of the present invention, depicting the operation of shifter plate 412, when no cassette is loaded into adapter module 310. When adapter module 310 is retracted, top plate 418 slides forward in relation to the frame of adapter module 310. Stop pin 519 then engages stationary peg 422. Stop pin 519 is part of shifter plate 412, which is itself attached to top plate 418. As top plate 418 continues to shift forward, this causes shifter plate 412 to rotate counter-clockwise around screw shaft 416, thereby causing gripper cam 404 (FIG. 4A) to shift downward to engage grip cam surfaces 440A and 440B against gripper cam followers 406A and 406B, thereby causing adapter module 310 to enter into a "grip mode" of operation.

Figure 8:
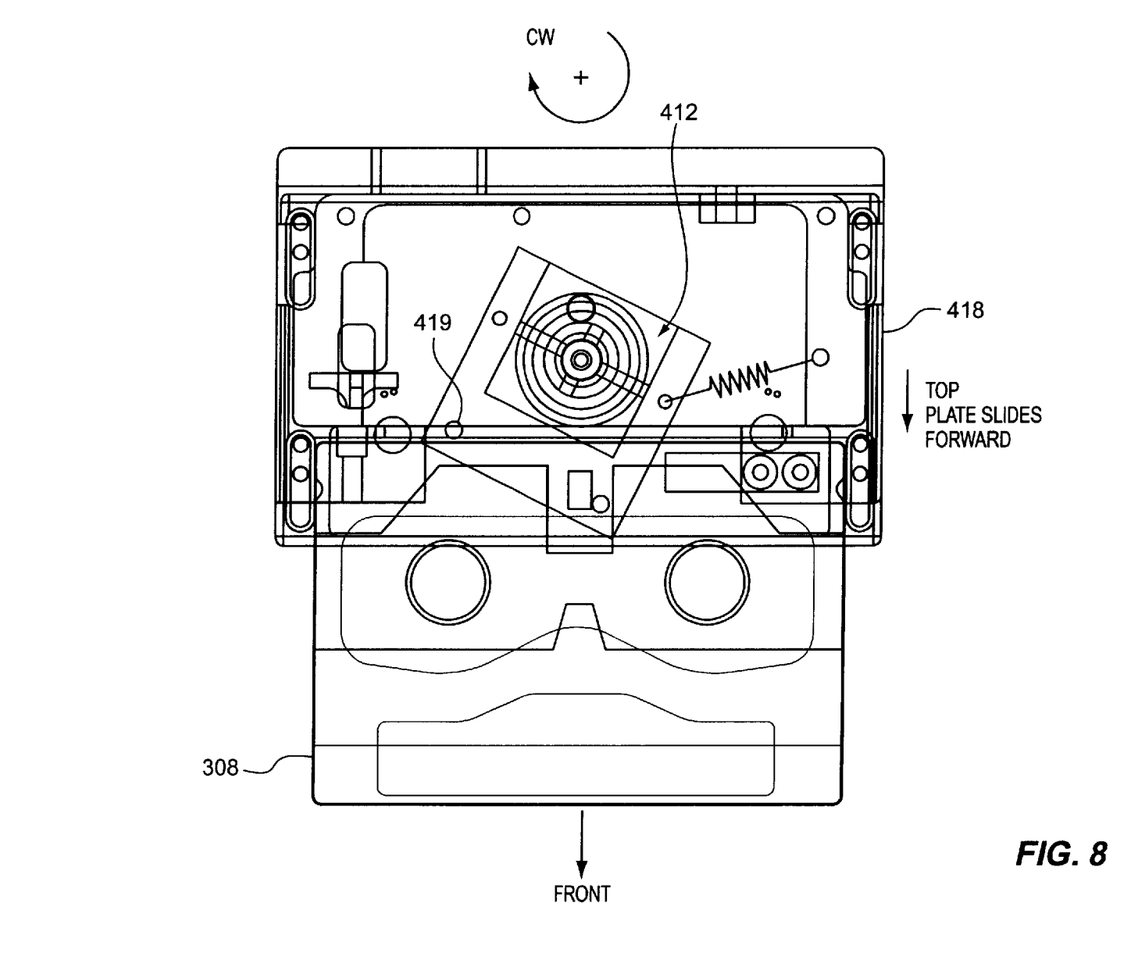
FIG. 8 is a partial transparent view of an adapter module with loaded data cassette in accordance with a preferred embodiment of the present invention.

FIG. 8 is a partial transparent top view of adapter module 310 in accordance with a preferred embodiment of the present invention, depicting the operation of shifter plate 412 when data cassette 308 is in the grip of adapter module 310. When data cassette 308 is loaded into adapter module 310, adapter module 310 is retracted, and top plate 418 slides forward, stop pin 419 comes into contact with the edge of data cassette 308. Thus, when top plate 418 slide forward, shifter plate 412 is rotated in a clockwise direction. This causes gripper cam 404 (FIG. 4A) to be shifted upward so as to engage gripper cam followers 406A and 406B on ungrip cam surfaces 442A and 442B (FIG. 4B), thereby causing adapter module 310 to enter into an "ungrip mode" of operation.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An adapter for holding a cartridge, comprising:
   an adapter housing, adapted to be attached to a robotic picker;
   at least one gripper finger adapted to hold the cartridge;
   at least one actuation point for actuating said at least one gripper finger; and
   a mechanism in association with the at least one actuation point, wherein if the at least one gripper finger is holding the cartridge and the at least one actuation point is actuated, the mechanism causes the at least one gripper finger to release the cartridge, and if the at least one gripper finger is not holding the cartridge and the at least one actuation point is actuated, the mechanism causes the at least one gripper finger to grasp the cartridge, wherein the mechanism includes:

a gripper cam having at least one grip cam surface and at least one ungrip cam surface;

at least one gripper cam follower, wherein if the at least one gripper finger is holding the cartridge, the at least one gripper cam follower follows the at least one ungrip cam surface, and if the at least one gripper finger is not holding the cartridge, the at least one gripper cam follower follows the at least one grip cam surface; and a shifter plate in association with the gripper cam, wherein when the adapter housing is retracted by the robotic nicker, the shifter plate moves the gripper cam so that the gripper cam followers follow one of the at least one grip cam surface and the at least one ungrip cam surface;

wherein if the at least one gripper finger is holding the cartridge and the adapter housing is retracted by the robotic picker, the shifter plate moves in a first direction, and if the at least one gripper finger is not holding the cartridge and the adapter housing is retracted by the robotic picker, the shifter plate moves in a second direction.

2. An adapter for holding a cartridge, comprising:

an adapter housing, adapted to be attached to a robotic picker;

at least one gripper finger adapted to hold the cartridge;

at least one actuation point for actuating said at least one gripper finger; and a mechanism in association with the at least one actuation point, wherein if the at least one gripper finger is holding the cartridge and the at least one actuation point is actuated, the mechanism causes the at least one gripper finger to release the cartridge, and if the at least one gripper finger is not holding the cartridge and the at least one actuation point is actuated, the mechanism causes the at least one gripper finger to grasp the cartridge, wherein the mechanism includes:

a gripper cam having at least one grip cam surface and at least one ungrip cam surface;

at least one gripper cam follower, wherein if the at least one gripper the at least one ungrip cam surface, and if the at least one gripper finger is not holding the cartridge, the at least one gripper cam follower follows the at least one grip cam surface; and a shifter plate in association with the gripper cam, wherein when the adapter housing is retracted by the robotic nicker, the shifter plate at least one grip cam surface and the at least one ungrip cam surface;

wherein the shifter plate rotates around a screw.

3. A gripper for holding a cartridge, comprising:

a gripper housing, configured to be attached to a robotic picker;

at least one gripper finger adapted to hold the cartridge;

at least one actuation point for actuating said at least one gripper finger; and a mechanism in association with the at least on actuation point wherein if the at least one gripper finger is holding the cartridge and the at least one actuation point is actuated, the mechanism causes the at least one gripper finger to release the cartridge, and if the at least one gripper finger is not holding the cartridge and the at least one actuation point is actuated, the mechanism causes the at least one gripper finger to grasp the cartridge, wherein the mechanism includes:

a gripper cam having at least one grip cam surface and at least one ungrip cam surface;

at least one gripper cam follower, wherein if the at least one gripper finger is holding the cartridge, the at least one gripper cam follower follows the at least one ungrip cam surface, and if the at least one gripper finger is not holding the cartridge, the at least one gripper cam follower follows the at least one grip cam surface; and a shifter plate in association with the gripper cam, wherein when the gripper housing is retracted by the robotic picker, the shifter plate moves the gripper cam so that the gripper cam followers follow one of the at least one grip cam surface and the at least one ungrip cam surface;

wherein if the at least one gripper finger is holding the cartridge and the gripper housing is retracted by the robotic picker, the shifter plate moves in a first direction, and if the at least one gripper finger is not holding the cartridge and the gripper housing is retracted by the robotic picker, the shifter plate moves in a second direction.

4. A gripper for holding a cartridge, comprising:

a gripper housing, configured to be attached to a robotic picker;

at least one gripper finger adapted to hold the cartridge;

at least one actuation point for actuating said at least one gripper finger; and a mechanism in association with the at least one actuation point, wherein if the at least one gripper finger is holding the cartridge and the at least one actuation point is actuated, the mechanism causes the at least one gripper finger to release the cartridge, and if the at least one gripper finger is not holding the cartridge and the at least one actuation point is actuated, the mechanism causes the at least one gripper finger to grasp the cartridge, wherein the mechanism includes:

a gripper cam having at least one grip cam surface and at least one ungrip cam surface;

at least one gripper cam follower, wherein if the at least one gripper finger is holding the cartridge, the at least one gripper cam follower follows the at least one ungrip cam surface, and if the at least one gripper finger is not holding the cartridge, the at least one gripper cam follower follows the at least one grip cam surface; and a shifter plate in association with the gripper cam, wherein when the gripper housing is retracted by the robotic picker, the shifter plate moves the gripper cam so that the gripper cam followers follow one of the at least one grip cam surface and the at least one ungrip cam surface;

wherein the shifter plate rotates around a screw.

5. A data cartridge library comprising:

a plurality of storage cells;

at least one cartridge drive;

a robotic picker;

a gripper housing attached to the robotic picker;

at least one gripper finger adapted to hold a cartridge;

at least one actuation point for actuating said at least one gripper finger; and a mechanism in association with the at least one actuation point, wherein if the at least one gripper finger is holding the cartridge and the at least one actuation point is actuated, the mechanism causes the at least one gripper finger to release the cartridge, and if the at least one gripper finger is not holding the cartridge and the at least one actuation point is actuated, wherein the mechanism includes:
- a gripper cam having at least one grip cam surface and at least one ungrip cam surface;
- at least one gripper cam follower, wherein if the at least one gripper finger is holding the cartridge, the at least one gripper cam follower follows the at least one ungrip cam surface, and if the at least one gripper finger is not holding the cartridge, the at least one gripper cam follower follows the at least one grip cam surface; and
- a shifter plate in association with the gripper cam, wherein when the gripper housing is retracted by the robotic picker, the shifter plate moves the gripper cam so that the gripper cam followers follow one of the at least one grip cam surface and the at least one ungrip cam surface;

wherein if the at least one gripper finger is holding the cartridge and the gripper housing is retracted by the robotic picker, the shifter plate moves in a first direction, and if the at least one gripper finger is not holding the cartridge and the gripper housing is retracted by the robotic picker, the shifter plate moves in a second direction.

6. A data cartridge library comprising:
a plurality of storage cells;
at least one cartridge drive;
a robotic picker;
a gripper housing attached to the robotic picker;
at least one gripper finger adapted to hold a cartridge;
at least one actuation point for actuating said at least one gripper finger; and
a mechanism in association with the at least one actuation point, wherein if the at least one gripper finger is holding the cartridge and the at least one actuation point is actuated, the mechanism causes the at least one gripper finger to release the cartridge, and if the at least one gripper finger is not holding the cartridge and the at least one actuation point is actuated, wherein the mechanism includes:
- a gripper cam having at least one grip cam surface and at least one ungrip cam surface;
- at least one gripper cam follower, wherein if the at least one gripper finger is holding the cartridge, the at least one gripper cam follower follows the at least one ungripper cam surface, and if the at least one gripper finger is not holding the cartridge, the at least one gripper cam follower follows the at least one grip cam surface; and
- a shifter plate in association with the gripper cam, wherein when the gripper housing is retracted by the robotic picker, the shifter elate moves the gripper cam so that the gripper cam followers follow one of the at least one grip cam surface and the at least one ungrip cam surface;

wherein the shifter plate rotates around a screw.

7. A robotic picker comprising:
a gripper housing;
at least one gripper finger adapted to hold a cartridge;
at least one actuation point for actuating said at least one gripper finger; and
a mechanism in association with the at least one actuation point, wherein if the at least one gripper finger is holding the cartridge and the at least one actuation point is actuated the mechanism causes the at least one gripper finger to release the cartridge, and if the at least one gripper finger is not holding the cartridge and the at least one actuation point is actuated, the mechanism causes the at least one gripper finger to grasp the cartridge, wherein the mechanism includes:
- a gripper cam having at feast one grip cam surface and at least one ungrip cam surface;
- at least one gripper cam follower, wherein if the at least one gripper finger is holding the cartridge, the at least one gripper cam follower follows the at least one ungrip cam surface, and if the at least one gripper finger is not holding the cartridge, the at least one gripper cam follower follows the at least one grin cam surface; and
- a shifter plate in association with the gripper cam, wherein the gripper housing is retractable, and when the gripper housing is retracted, the shifter plate moves the gripper cam so that the gripper cam followers follow one of the at least one grip cam surface and the at least one ungrip cam surface;

wherein if the at feast one gripper finger is holding the cartridge and the gripper housing is retracted, the shifter plate moves in a first direction, and if the at least one gripper finger is not holding the cartridge and the gripper housing is retracted, the shifter plate moves in a second direction.

8. A robotic picker comprising:
a gripper housing;
at feast one gripper finger adapted to hold a cartridge;
at least one actuation point for actuating said at least one gripper finger; and
a mechanism in association with the at least one actuation point wherein if the at least one gripper finger is holding the cartridge and the at least one actuation point is actuated, the mechanism causes the at least one gripper finger to release the cartridge, and if the at least one gripper finger is not holding the cartridge and the at least one actuation point is actuated, the mechanism causes the at least one gripper finger to grip the cartridge, wherein the mechanism includes:
- a gripper cam having at least one grip cam surface and at least one ungrip cam surface;
- at least one gripper cam follower, wherein if the at least one gripper finger is holding the cartridge, the at least one grinner cam follower follows the at least one ungrip cam surface, and if the at least one gripper finger is not holding the cartridge, the at least one gripper cam follower follows the at least one grip cam surface; and
a shifter plate in association with the gripper cam, wherein the gripper housing is retractable, and when the gripper housing is retracted, the shifter plate moves the grinner cam so that the gripper cam followers follow one of the at least one grip cam surface and the at least one ungrip cam surface;

wherein the shifter plate rotates around a screw.

9. A method of handling a cartridge, comprising the steps of:
extending an adapter module so that the adapter module attempts to grasp the cartridge;
retracting the adapter module, wherein the step of retracting the adapter module enables the adapter module to change to a grip mode; and extending the adapter module so that the adapter module grips the cartridge.

10. An apparatus for handling a cartridge, comprising means for:

extending an adapter module so that the adapter module attempts to grasp the cartridge;

retracting the adapter module, wherein the step of retracting the adapter module enables the adapter module to change to a grip made; and extending the adapter module so that the adapter module grips the cartridge.

11. In a data cartridge library comprising a plurality of storage cells, at least one cartridge drive, a robotic picker, and a gripper housing releaseably attachable to the robotic picker, a method of handling a plurality of cartridges having different sizes, comprising the steps of:

retrieving the gripper housing from one of the storage cells by the robotic picker;

retrieving one of the plurality of cartridges using the gripper housing, such retrieved cartridge having a first size;

loading the first size retrieved cartridge into a cartridge drive using the gripper housing;

placing the gripper housing in one of the plurality of storage cells;

retrieving one of the plurality of cartridges using the robotic picker, such retrieved cartridge having a second size different than the first size; and loading the second size retrieved cartridge into a cartridge drive using the robotic picker.

* * * * *